United States Patent
Zhang et al.

(10) Patent No.: US 9,833,934 B2
(45) Date of Patent: Dec. 5, 2017

(54) METHOD FOR PRODUCING SHAPE MEMORY ANTI-COUNTERFEITING IDENTIFIER

(75) Inventors: Zhongqun Zhang, Guangzhou (CN); Yiye Zhang, Guangzhou (CN); Lilan Ke, Guangzhou (CN)

(73) Assignee: GUANGZHOU MANBORUI MATERIAL TECHNOLOGY CO., LTD. (CN)

( * ) Notice: Subject to any disclaimer, the term of this patent is extended or adjusted under 35 U.S.C. 154(b) by 966 days.

(21) Appl. No.: 13/876,864

(22) PCT Filed: Dec. 22, 2010

(86) PCT No.: PCT/CN2010/080101
§ 371 (c)(1),
(2), (4) Date: Jul. 12, 2013

(87) PCT Pub. No.: WO2012/040985
PCT Pub. Date: Apr. 5, 2012

(65) Prior Publication Data
US 2013/0300026 A1 Nov. 14, 2013

(30) Foreign Application Priority Data
Sep. 30, 2010 (CN) .......................... 2010 1 0500997

(51) Int. Cl.
| | | |
|---|---|---|
| *B29C 45/00* | (2006.01) | |
| *B29C 59/02* | (2006.01) | |
| *B29C 59/18* | (2006.01) | |
| *B29C 59/04* | (2006.01) | |
| *B29C 61/00* | (2006.01) | |
| *B29C 61/04* | (2006.01) | |
| *B42D 25/475* | (2014.01) | |
| *B42D 25/48* | (2014.01) | |
| *B29B 13/02* | (2006.01) | |
| *B29C 47/00* | (2006.01) | |
| *B29K 21/00* | (2006.01) | |
| *B29K 23/00* | (2006.01) | |
| *B29K 27/06* | (2006.01) | |
| *B29K 67/00* | (2006.01) | |

(52) U.S. Cl.
CPC .......... *B29C 45/0001* (2013.01); *B29C 59/02* (2013.01); *B29C 59/04* (2013.01); *B29C 59/18* (2013.01); *B29C 61/003* (2013.01); *B29C 61/04* (2013.01); *B42D 25/475* (2014.10); *B42D 25/48* (2014.10); *B29B 13/023* (2013.01); *B29C 45/0055* (2013.01); *B29C 47/0019* (2013.01); *B29C 47/0021* (2013.01); *B29C 2793/009* (2013.01); *B29K 2021/003* (2013.01); *B29K 2023/083* (2013.01); *B29K 2023/12* (2013.01); *B29K 2027/06* (2013.01); *B29K 2067/00* (2013.01); *B29K 2067/046* (2013.01)

(58) Field of Classification Search
CPC ... B29C 45/0001; B29C 61/003; B29C 61/06; B29C 59/04; B29C 59/18; B29C 59/02; B29C 45/0055; B42D 25/48; B42D 25/475; B42D 25/29; B29K 2023/12; B29K 2067/00
USPC .................................. 264/230, 176.1, 328.1
See application file for complete search history.

(56) References Cited

U.S. PATENT DOCUMENTS

| | | | | |
|---|---|---|---|---|
| 4,968,370 A | * | 11/1990 | Watkins | G11B 7/263 156/232 |
| 4,971,646 A | * | 11/1990 | Schell | B32B 37/1207 156/244.17 |
| 5,928,803 A | * | 7/1999 | Yasuda | A63H 33/22 374/101 |
| 6,045,894 A | * | 4/2000 | Jonza | B32B 27/36 428/141 |
| 6,245,418 B1 | | 6/2001 | Freedman | |

(Continued)

FOREIGN PATENT DOCUMENTS

| | | |
|---|---|---|
| CN | 1146033 | 3/1997 |
| CN | 1587001 | 3/2005 |
| CN | 101826278 | 9/2010 |
| CN | 101916528 | 12/2010 |
| CN | 101916528 A | 12/2010 |
| DE | 20003942 | 10/2000 |
| EP | 0667234 | 8/1995 |

OTHER PUBLICATIONS

Corresponding European Search Report for PCT/CN2010080101 dated Feb. 1, 2016.

Corresponding Chinese Office Action dated Nov. 10, 2011.

*Primary Examiner* — Nahida Sultana
(74) *Attorney, Agent, or Firm* — The Belles Group, P.C.

(57) ABSTRACT

A method for producing shape memory anti-counterfeiting identifier includes the following steps: a high polymer material with a shape memory function without the need of sunshine cross-linking or chemical cross-linking is directly extruded to become sheet in an extruder or is injected to be molded in an injection molding machine, and the extruded sheet can be a planar sheet or a sheet having a surface on which concave-convex patterns or characters are formed; the above sheet is then heated to the temperature higher than the vitrification temperature and lower than the melting point temperature, and the patterns or characters are pressed on the planar sheet, or the sheet on which the concave-convex patterns or characters are already formed is pressed to become planes or other patterns and characters; the sheet is then cut into small sheets, wherein one pattern or one group of characters is implied on every small sheet, and when the small sheets are again heated to the temperature higher than the vitrification temperature and lower than the melting point temperature, they will return to the extruded state.

13 Claims, No Drawings

(56) References Cited

U.S. PATENT DOCUMENTS

| | | | |
|---|---|---|---|
| 2003/0141373 A1* | 7/2003 | Lasch | G06K 7/0008 235/487 |
| 2003/0193883 A1* | 10/2003 | Parks | G11B 19/122 369/288 |
| 2005/0019680 A1* | 1/2005 | Pinchen | G07D 7/0013 430/10 |
| 2005/0067090 A1* | 3/2005 | Nakayama | B41M 5/385 156/235 |
| 2007/0096359 A1* | 5/2007 | Torfs | B29C 33/424 264/219 |
| 2007/0195387 A1* | 8/2007 | Weyermann | G03H 1/0236 359/3 |
| 2007/0234619 A1 | 10/2007 | Price | |
| 2007/0259598 A1 | 11/2007 | Ribi | |
| 2008/0085946 A1 | 4/2008 | Mather et al. | |
| 2008/0136160 A1* | 6/2008 | Leenders | B41M 5/0029 283/72 |
| 2008/0197620 A1* | 8/2008 | Spencer | G06K 19/086 283/81 |
| 2009/0036304 A1* | 2/2009 | Misner | C09D 11/50 503/201 |
| 2010/0025881 A1* | 2/2010 | Seth | A44B 18/0046 264/145 |
| 2010/0110514 A1* | 5/2010 | Houha | B29C 70/585 359/2 |
| 2010/0271174 A1* | 10/2010 | Kaminska | B42D 25/29 340/5.86 |
| 2011/0020606 A1* | 1/2011 | Herslow | B32B 3/30 428/162 |
| 2013/0299594 A1* | 11/2013 | Anzalone | G06K 19/041 235/492 |
| 2014/0023838 A1* | 1/2014 | Egli | B42D 25/23 428/204 |
| 2015/0119238 A1* | 4/2015 | Pretsch | C08J 7/065 503/204 |
| 2016/0176223 A1* | 6/2016 | Degott | C09D 5/36 283/85 |

* cited by examiner

METHOD FOR PRODUCING SHAPE MEMORY ANTI-COUNTERFEITING IDENTIFIER

CROSS-REFERENCE TO RELATED APPLICATIONS

The present application is a U.S. national stage application under 35 U.S.C. §371 of PCT Application No. PCT/CN2010/080101, filed Dec. 22, 2010, which in turn claims the benefit of Chinese Patent Application No. 201010500997.9, filed Sep. 30, 2010, the entireties of which are incorporated herein by reference.

FIELD OF THE INVENTION

The present application relates to a producing method, and particularly to a method for producing a shape memory anti-counterfeiting identifier.

BACKGROUND OF THE INVENTION

Chinese patent application (No. 201010239475.8) discloses a "method for producing shape memory anti-counterfeiting identifier" which can achieve an anti-counterfeiting on goods by utilizing high molecular polymers with shape memory effect that can remain shapes formed thereon. Their common characteristic is that an irradiation cross-linking or a chemical cross-linking is to be performed on the polymer materials. The irradiation cross-linking requires more processing steps, while the chemical cross-linking has strict requirements on the manufacturing technique, or it is likely to cause waste products. Some polymer materials have the shape memory property after being processed by the irradiation cross-linking or the chemical cross-linking. However, some polymer materials have the shape memory property without being processed by the irradiation cross-linking or the chemical cross-linking.

SUMMARY OF THE INVENTION

An object of the present application is to provide a method for producing a shape memory anti-counterfeiting identifier, which is simple in process and can produce a high molecular shape memory anti-counterfeiting identifier without an irradiation cross-linking or a chemical cross-linking.

The object of the present application can be achieved by the following measures: in a method for producing a shape memory anti-counterfeiting identifier, a polymer material having a shape memory property without being processed by an irradiation cross-linking or a chemical-linking is extruded into a sheet by an extruder, or is injection molded by an injection molding machine, the extruded sheet may be a planar sheet or a sheet having a surface formed with concave or convex patterns or characters; then the sheet is heated to a temperature which is higher than its glass transition temperature and is lower than its melting point; patterns or characters are pressed on the planar sheet, or the sheet, which is formed with concave or convex patterns or characters, is pressed into a planar sheet or is formed with other patterns or characters; then the sheet is cut into small sheets, with each small sheet implying one pattern or one group of characters. Where the small sheets are heated to a temperature which is higher than their glass transition temperature and is lower than their melting point, they will return to their extruded states.

The object of the present application can also be achieved by the following measures: in the extruding or injection molding process, an embossing roller of a sheet extruder unit may be employed to form concave or convex patterns or characters on the surface of the extruded sheet, or a mould may be employed to form concave or convex patterns or characters on the surface of the injection product; the above-mentioned sheet is then heated to a temperature which is higher than its glass transition temperature and is lower than its melting point; then the concave or convex patterns or characters on the heated sheet are pressed into other patterns or characters, or are pressed into a plane, by a two-roller or three-roller calender; then the sheet is cut into small sheets, with each small sheet implying one pattern or one group of characters. Alternatively, a polymer material having the shape memory property without being processed by the irradiation cross-linking or the chemical cross-linking may be injection molded into a semi-finished product having a certain shape by an injection molding machine; then the semi-finished product is heated to a temperature which is higher than its glass transition temperature and is lower than its melting point; and then the shape of the semi-finished product is deformed and the deformed shape is retained; where the deformed products are reheated to a temperature which is higher than their glass transition temperature and is lower than their inciting point, they will return to their injected states. A polymer material having the shape memory property without being processed by the irradiation cross-linking or the chemical cross-linking is extruded into a planar sheet; the planar sheet is then cut into a required size according to a dimension of a hot-pressing mould; and then the sheet is put into the hot-pressing mould to hot press concave or convex patterns or characters on the surface of the sheet. The extruder may be a single-screw sheet extruder unit. A surface of a roller of the single-screw sheet extruder unit is provided with a plurality of identical patterns or groups of identical characters, which identical patterns or characters are spaced at a distance and are concave or convex. For the aforementioned sheet having the concave or convex patterns or characters on its surface, the concave or convex patterns or characters of the sheet are stamped into other patterns or characters by using a stamping machine and a mould at the normal temperature. The planar sheet has a thickness of 0.1-2.0 mm, and the sheet with the concave or convex patterns has a thickness of 0.1-2.0 mm. The polymer material having the shape memory property without being processed by the irradiation cross-linking or the chemical cross-linking may be a polylactic acid material, a polyester material, a polyvinyl chloride material, a polypropylene material, an ethylene-vinyl acetate polymer material, a norbornene material, a thermoplastic polyurethane elastomer material, a polyether ester thermoplastic elastomer material, or a styrene thermoplastic elastomer material. A printing material for forming the patterns or characters may be a temperature sensitive ink. The polymer material having the shape memory property without being processed by the irradiation cross-linking or the chemical cross-linking may also be molded by a molding machine.

Compared with the prior art, the present application has advantageous effects, for example:

1. The processing steps are reduced, the control of the production process is simplified and the cost is saved since no cross-linking process is required.

2. A temperature sensitive ink, including a reversible temperature sensitive ink and an irreversible temperature sensitive ink, may be used to enhance the anti-counterfeiting effect. Thereby, a color-changeable planar effect and a shape memory-changeable three-dimensional effect are combined together, generating a distinct visual feeling.

DETAILED DESCRIPTION

The present application will be described in detail in conjunction with embodiments hereinafter.

First Embodiment

A single-screw sheet extruder unit is employed, and a surface of a roller of the sheet extruder unit is provided with a plurality of identical patterns or groups of identical characters, which identical patterns or characters are spaced at a distance and are concave or convex. A thermoplastic polyurethane elastomer or the like having a shape memory property is extruded into a sheet having concave or convex patterns or characters corresponding to those of the roller on its surface, and a thickness of the sheet is 0.1-2 mm, and preferably is 0.3-0.5 mm. Then, the sheet is heated to a temperature which is higher than its glass transition temperature and is lower than its melting point. And then the concave or convex patterns or characters on the heated sheet are flatted by a two-roller or three-roller calender and are then printed by an irreversible temperature sensitive ink, the irreversible temperature sensitive ink having a color change temperature approach to a deformation temperature of a high molecular shape memory material and being colored at the normal temperature, while becoming colorless after being heated to a certain temperature. Then the sheet is cut into small sheets, with each small sheet implying one pattern or one group of characters. The small sheets are stuck on the goods, where it needs to test the authenticity of the goods, the small sheets are putted into boiling water or are heated in other manners to a temperature which is higher than the glass transition temperature of the thermoplastic polyurethane elastomer and is lower than the melting point thereof, then colors of the small sheets would change and patterns or characters corresponding to those on the roller appear on the sheets, thereby playing a role of anti-counterfeiting.

Second Embodiment

For styrene thermoplastic elastomer, a surface of an injection product is formed with concave or convex patterns (characters) by an injection molding machine and a mould. Then the injection product is heated to a temperature which is higher than its glass transition temperature and is lower than its melting point. The patterns (characters) formed on the surface of the injection product are pressed into other patterns (characters), or are pressed into a plane. Where the products are heated to a temperature which is higher than their glass transition temperature and is lower than their melting point, the injection molded concave or convex patterns (characters) will appear again.

Third Embodiment

A polylactic acid material is extruded into a planar sheet. The planar sheet is then cut into a required size according to a dimension of a hot-pressing mould and is put into the hot-pressing mould. Then concave or convex patterns (characters) are hot pressed on a surface of the sheet at a temperature range of 60-65 degree Celsius (the glass transition temperature of the polylactic acid material is 55 degree Celsius). The sheet with the concave or convex patterns (characters) has a thickness of 0.1-2.0 mm. The planar sheet has a thickness of 0.1-2.0 mm. Where it needs to test the authenticity of the goods, the small sheets are put into boiling water or are heated to about 65 degree Celsius in other manner, the concave or convex patterns (characters) on the small sheets disappear and return to a plane, which plays a role of anti-counterfeiting.

Fourth Embodiment

In the case of sheets with concave or convex patterns (characters) formed on surfaces thereof according to the first embodiment and the second embodiment, the concave or convex patterns (characters) on the sheet or the thin film are stamped into other patterns (characters) by a stamping machine and a mould at the normal temperature. Then the sheet is cut into small sheets, with each small sheet implying one pattern or one group of characters. The small sheets are stuck on the goods. Where it needs to test the authenticity of the goods, the small sheets are putted into boiling water or are heated in other manner such that patterns or characters corresponding to those on the roller appear on the small sheets, which thereby playing a role of anti-counterfeiting.

Fifth Embodiment

The aforementioned extruded semi-finished products of the sheet with patterns or characters (or other semi-finished products formed by other forming ways) are processed to have a certain color (such as blue), and then undergo a second forming process. Then patterns or characters on the semi-finished product formed by the second forming process are printed to have another color (such as red) using an irreversible temperature sensitive ink. Since the temperature sensitive ink has a color change temperature approach to a deformation temperature of a high molecular shape memory material and is colored at the normal temperature, while it becomes colorless after being heated to a certain temperature, a shape memory anti-counterfeiting identifier with the temperature sensitive ink is obtained. Where the anti-counterfeiting identifier is heated to a certain temperature, not only the patterns or characters on the anti-counterfeiting identifier change in a three-dimensional way, but also the color changes. Alternatively, the patterns or characters on the blue semi-finished product may be printed to have a red color by using a non-temperature sensitive ink, and then all of the product including the patterns or characters and other parts are printed into green by using the temperature sensitive ink.

Sixth Embodiment

A shape memory polyurethane material is injection molded into a cylinder by an injection molding machine and a mould. Then the cylinder is heated to a temperature which is higher than the glass transition temperature of the shape memory polyurethane and is lower than the melting point thereof, and then the cylinder is pressed into a circular sheet. In a case that the circular sheets are reheated to a temperature which is higher than the glass transition temperature of the shape memory polyurethane and is lower than the melting point thereof, they will return to the cylinders as they are injection molded.

What is claimed is:

1. A method for producing a shape memory anti-counterfeiting identifier, the method comprising:
   providing a polymer material which has a shape memory property and has not been processed by an irradiation cross-linking or a chemical-linking;
   extruding the polymer material into a sheet by an extruder to achieve an extruded state, or injection molding the polymer material by an injection molding machine to achieve a molded state, wherein the sheet in the extruded or molded state is solidified and has a surface formed with concave or convex patterns or characters;
   heating the sheet to a temperature which is higher than its glass transition temperature and is lower than its melting point;
   pressing the sheet (i) into a planar sheet or (ii) with other patterns or characters; and
   cutting the sheet into small sheets, with each small sheet comprising one pattern or one group of characters of the patterns or characters; and
   pressing the sheet (i) into a planar sheet or (ii) with other patterns or characters, the concave or convex patterns or characters of the sheet are stamped into other patterns or characters by using a stamping machine and a mould at the normal temperature.

2. The method for producing the shape memory anti-counterfeiting identifier according to claim 1, wherein:
   in the extruding or the injection molding step, an embossing roller of a sheet extruder unit is employed to form the concave or convex patterns or characters on the surface of the extruded sheet, or a mould is employed to form the concave or convex patterns or characters on the surface of the injection product; and
   the pressing of the sheet his performed by a two-roller or a three-roller calendar.

3. The method for producing the shape memory anti-counterfeiting identifier according to claim 1, wherein:
   the polymer material is injection molded into a semi-finished product having a certain shape by the injection molding machine to achieve the solidified molded state;
   after the semi-finished product is heated to the temperature which is higher than its glass transition temperature and is lower than its melting point, the shape of the semi-finished product is deformed and the deformed shape is retained; and
   when the deformed products are reheated to the temperature which is higher than their glass transition temperature and is lower than their melting point, the deformed products return to their molded states.

4. The method for producing the shape memory anti-counterfeiting identifier according to claim 1, wherein the polymer material is extruded into the planar sheet; the planar sheet is cut into a required size according to a dimension of a hot-pressing mould; then the sheet is put into the hot-pressing mould, and concave or convex patterns or characters are hot pressed on the surface of the sheet surface.

5. The method for producing the shape memory anti-counterfeiting identifier according to claim 1, wherein the extruder is a single-screw sheet extruder unit, a surface of a roller of the single-screw sheet extruder unit is provided with a plurality of identical patterns or groups of identical characters, which identical patterns or characters are spaced at a distance and are concave or convex.

6. The method for producing the shape memory anti-counterfeiting identifier according to claim 2, wherein the planar sheet has a thickness of 0.1-2.0 mm, and the sheet with the concave or convex patterns has a thickness of 0.1-2.0 mm.

7. The method for producing the shape memory anti-counterfeiting identifier according to claim 1, wherein the polymer material is a polylactic acid material, a polyester material, a polyvinyl chloride material, a polypropylene material, an ethylene-vinyl acetate polymer material, a norbornene material, a thermoplastic polyurethane elastomer material, a polyether ester thermoplastic elastomer material, or a styrene thermoplastic elastomer material.

8. The method for producing the shape memory anti-counterfeiting identifier according to claim 1, wherein a printing material for forming the patterns or characters is a temperature sensitive ink.

9. The method for producing the shape memory anti-counterfeiting identifier according to claim 1, wherein the polymer material is molded by an additional molding machine.

10. The method for producing the shape memory anti-counterfeiting identifier according to claim 2, wherein the extruder is a single-screw sheet extruder unit, a surface of a roller of the single-screw sheet extruder unit is provided with a plurality of identical patterns or groups of identical characters, which identical patterns or characters are spaced at a distance and are concave or convex.

11. The method for producing the shape memory anti-counterfeiting identifier according to claim 2, wherein for the sheet having the concave or convex patterns or characters on its surface, the concave or convex patterns or characters of the sheet are stamped into other patterns or characters by using a stamping machine and a mould at the normal temperature.

12. The method for producing the shape memory anti-counterfeiting identifier according to claim 4, wherein the planar sheet has a thickness of 0.1-2.0 mm, and the sheet with the concave or convex patterns has a thickness of 0.1-2.0 mm.

13. A method for producing an anti-counterfeiting identifier, the method comprising:
   providing a polymer material;
   extruding the polymer material into a sheet to achieve an extruded state, or injection molding the polymer material to achieve a molded state, wherein the sheet in the extruded or molded state is solidified and has a surface formed with concave or convex patterns or characters;
   heating the sheet to a temperature which is higher than its glass transition temperature and is lower than its melting point;
   pressing the sheet (i) into a planar sheet or (ii) with other patterns or characters; and
   cutting the sheet into small sheets, with each small sheet comprising one pattern or one group of characters of the patterns or characters; and
   pressing the sheet (i) into a planar sheet or (ii) with other patterns or characters, the concave or convex patterns or characters of the sheet are stamped into other patterns or characters by using a stamping machine and a mould at the normal temperature.

* * * * *